Oct. 7, 1941.    S. L. CLOTHIER    2,257,938
MECHANICAL CONSTANT SPEED PROJECTOR
Filed April 28, 1939    2 Sheets—Sheet 1
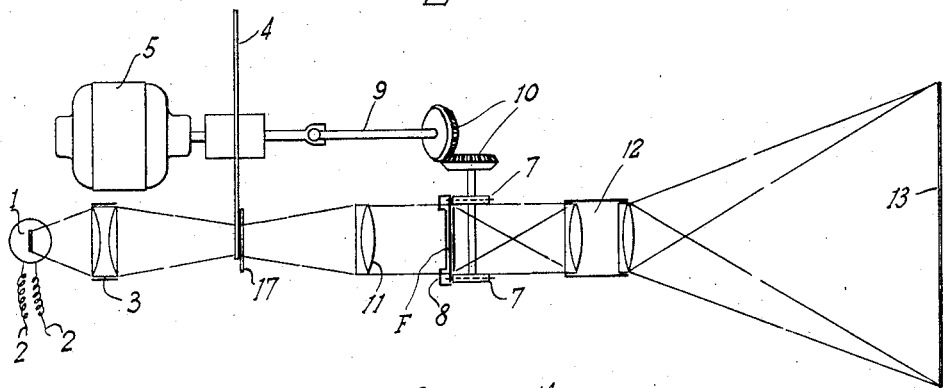
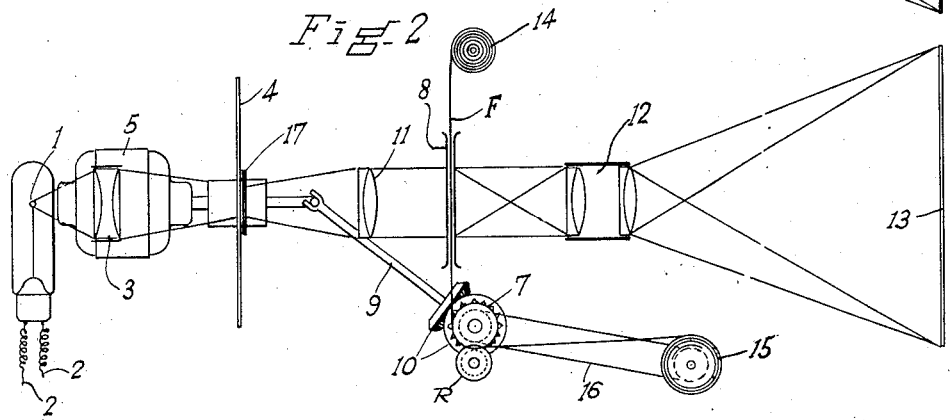
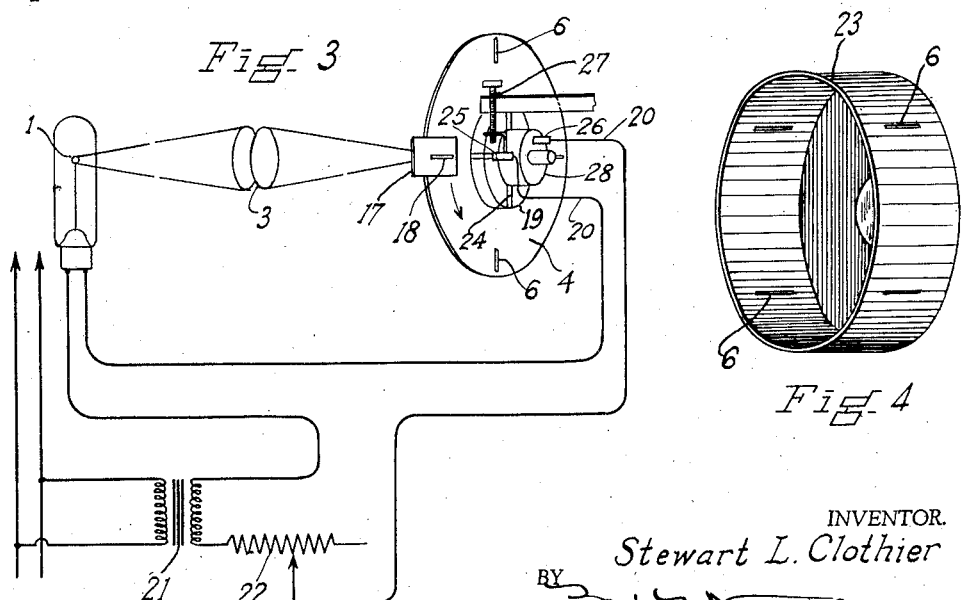
INVENTOR.
Stewart L. Clothier
BY
ATTORNEY.

Oct. 7, 1941.  S. L. CLOTHIER  2,257,938
MECHANICAL CONSTANT SPEED PROJECTOR
Filed April 28, 1939  2 Sheets-Sheet 2
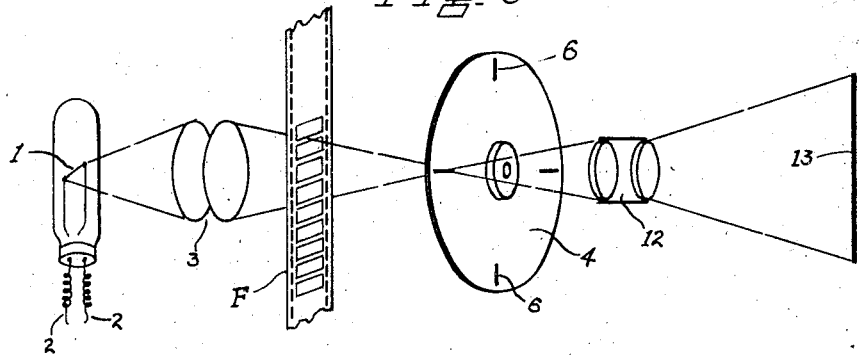
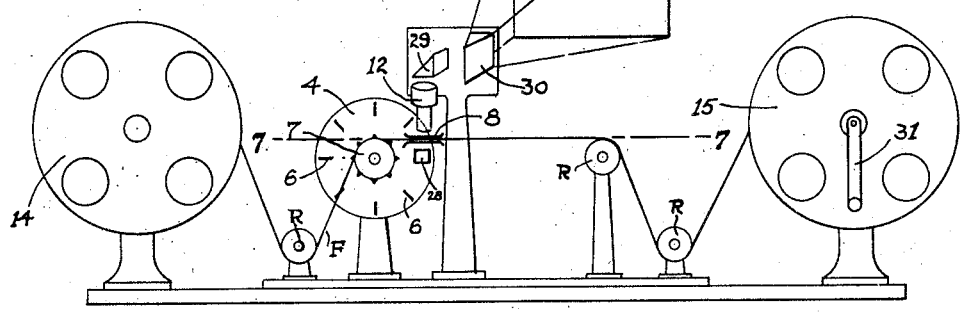
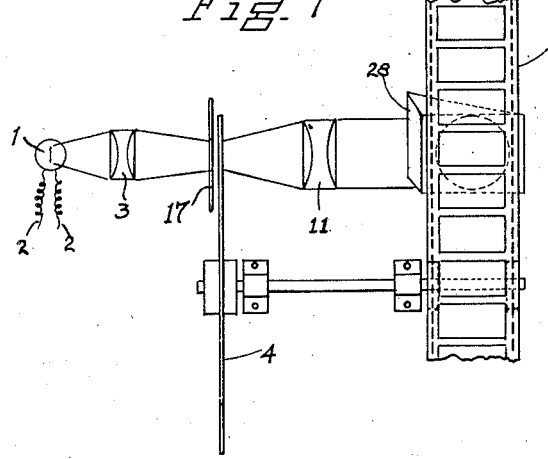
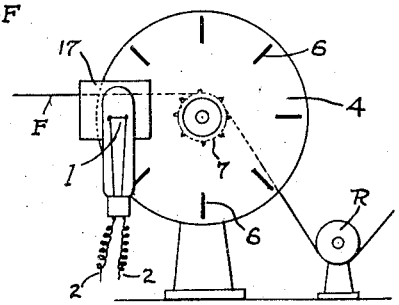
INVENTOR.
Stewart L. Clothier
BY
ATTORNEY.

Patented Oct. 7, 1941

2,257,938

UNITED STATES PATENT OFFICE 2,257,938

MECHANICAL CONSTANT SPEED PROJECTOR

Stewart L. Clothier, Teaneck, N. J., assignor to Kolorama Laboratories, Inc., Newark, N. J., a corporation of New Jersey Application April 28, 1939, Serial No. 270,640

8 Claims. (Cl. 88—16.8)

This invention relates to motion picture projectors and particularly to a novel constant speed projector adaptable to high speed use.

In processing of motion picture films and in the examination of film prints prior to their release, it is desirable to run the film at higher speed than the normal projection rate of 24 frames per second. Speeds of 120 frames per second and higher are often desirable. The conventional intermittent movement is of course of no value at these speeds and some type of constant speed projector is required.

In a copending application filed April 28, 1939, Serial No. 270,639, I have disclosed one solution to this problem wherein the desired result is accomplished by a combination of mechanical and electronic principles. The present invention comprises a much simpler solution and one which is entirely mechanical.

As disclosed in the aforesaid copending application, it is only necessary to flash a light source for brief intervals and in synchronism with the frame speed of the film to project a picture from a rapidly moving film and obtain a picture suitable for film examination purposes. The duration of each flash must be a small fraction of the frame period to produce a satisfactory picture. Even, when a suitably short flash period is used, the reproduction of action in the film record will be blurred at the high speeds possible with this device, however, the picture background, moderately fast action, and of course, titles, will be reproduced sharply and enable a good inspection of the film to be made, even though the film may be constantly moving at a speed of 120 frames per second or even higher.

Fig. 1 is a top view of a projector embodying principles of the invention.

Fig. 2 is a side view of the apparatus shown in Fig. 1.

Fig. 3 is a schematic view showing the use of a commutator to obtain improved operation in certain applications.

Fig. 4 illustrates a slotted drum which may be used to replace the slotted disc of Figs. 1, 2 and 3.

Fig. 5 shows a different arrangement of the apparatus to carry out the invention.

Fig. 6 illustrates the application of the invention to a film rewinding machine for inspection purposes.

Fig. 7 is a top view of a section of Fig. 6 below line 7—7.

Fig. 8 is a rear view of the center portion of Fig. 6.

Returning to Figs. 1 and 2, a film F is moved continuously through a gate 8 by sprockets 7, roller R being used to hold the film against the sprockets. A light source such as an incandescent filament 1 supplied with current through wires 2 illuminates condensing lens 3. Condensing lens 3 converges the light beam and produces an image of the source 1 in the plane of the disc 4. This disc 4 is mounted on the motor 5 which revolves it at a desired speed. The disc is provided with a number of slots 6 (as shown in Fig. 3) of predetermined size and number. The motor also drives sprockets 7 through shaft 9 and suitable gears 10.

The light which passes through the slots 6 is collected by lens 11 and illuminates the film F in gate 8. The emergent light passes into the projection lens 12 which is adjusted to focus an image of the film F on screen 13.

With filament 1 constantly illuminated, the disc 4 passes light to the film F only for a brief instant during each frame. Each succeeding frame is substantially in the same position in gate 8 when its image is projected on screen 13. The result is a series of projected stationary images of the successive frames of the film as a motion picture on screen 13 regardless of how fast motor 5 moves the film. The only speed limitation is the tensile strength of the film.

As indicated in Fig. 2 the film may be on a spool 14, pass thru gate 8 around driving sprockets 7 and then onto a rewind spool 15 driven by belt 16.

The device as just described may be operated by a variable speed motor to reproduce a motion picture at speeds variable from 0 to 120 frames per second or higher. For example, it may be operated at normal 24 frames per second speed for portions of the film predominant in action and then it may be speeded up for sequences involving little action. In some cases, it may be desirabel to employ a synchronous motor 5 and at the same time use another synchronous motor to drive sprockets 7 directly instead of using gears 10 and shaft 9, the two motors being locked in synchronism by using the same power supply circuit.

As previously mentioned, the light flash period must be a small fraction of the total frame period. Therefore, the width of slots 6 related to their circumferential separation must be in the same proportion. I have found that with a disc diameter of 6", the disc having 4 slots and a circumferential separation of about 4½ inches, satisfactory film examination can be obtained with slot widths up to .045". These dimensions are also determined to some extent by the sharpness of the filament image on disc 4. This sharpness may be improved by the use of a mask 17 having a slot 18 similar to the disc slots and shown more clearly in Fig. 3. The sharpness of the resulting motion picture is also dependent to a large extent on the accuracy of synchronization of the disc speed with the film speed.

Considerable improvement in light efficiency is obtained in moderate speed applications when the arrangement of Fig. 3 is employed. Here a commutator 19 with a connecting bar 24 related to each slot is connected to filament f thru brushes 25 and 26 and thru wires 20—20 as shown. Transformer 21 supplies a secondary voltage much higher than the rated voltage of filament 1. The current flow is adjustable by means of rheostat 22. If the disc and commutator are rotating and rheostat 22 is cut out gradually, a point is found where filament 1 appears to have its normal, continuous current brilliance. Actually, however, the instantaneous brilliance of the lamp is much greater than before and all that is necessary is to make these brilliance peaks coincide with the slot flashing positions. A slight brush adjustment is provided for this purpose as by adjusting screw 27.

The thermal lag of the incandescent lamp will determine the limiting frequency for increased efficiency, but not the limit of operating speed. At 24 frames per second a great increase is obtained whereas at 120 frames the increased efficiency is not so noticeable.

In Fig. 4 an alternative slotted drum 23 is illustrated which might readily be used in place of the slotted disc 4 already described, as will be immediately obvious to those skilled in the art.

Figure 5 shows an arrangement of the apparatus whereby the light beam is first projected through the film F and then passed thru the shutter slots 6. In this case, the cross section of the beam covers at least a full frame at the film F and then converges to a filament image on the disc. The light passing through the disc is gathered directly by the projection lens 12 which images the film on the screen 13.

Figs. 6, 7 and 8 illustrate an embodiment of the invention, mounted on a suitable base and supporting brackets as shown, in which the shutter disc 4 is driven directly by the film F. The film itself may be moved as by the crank handle 31. In this case as before, the number of slots 6 required is determined by the number of frames contained in the sprocket circumference. For example, in 35 mm. film there are 4 sprocket holes per frame and a standard 16 tooth 35 mm. sprocket would require a slotted disc having four slots. A standard 8 tooth 16 mm. sprocket would require a disc having 8 slots, there being only one sprocket hole per frame in 16 mm. film, i. e., one slot is required for each film frame. Since in this embodiment, the disc 4 and sprockets 7 are driven by the film itself, it is important that the inertia of the combination be kept as low as possible to prevent damage to the film. For this reason it is preferable to employ sprockets 7 and hub of light weight and the disc 4 can be of thin aluminum, relatively small diameter, compared to the disc 4 of Figs. 1, 2 and 3. The smaller diameter will of course necessitate narrower slots 6 and a smaller filament image at the disc plane. As shown in Fig. 6 the flashing light after passing through the film F may enter a projection lens 12 which images the film F on a viewing screen 13. The prisms or mirrors 28, 29 and 30 are used merely to direct the light beam in the required path and to obtain the final image in the desired upright position for convenience in viewing. Rollers R are likewise used for convenience to supply the proper path for the film.

The embodiments of the invention shown are for convenience only and it is not to be construed that the invention is limited by them. Various modifications may be made within the scope of the appended claims.

I claim:

1. A motion picture projector including a film gate for exposing a picture frame, means for continuously moving a motion picture film having successive picture frames thereon through said gate, a light source, a slotted light shuttering device positioned between the light source and the film gate, means focussing an image of the light source at the plane of the shuttering device, means to illuminate a picture frame exposed in the film gate with light passing through a slot of the shuttering device, and means for rotating said shuttering device in synchronism with the film movement and in such manner that each successive picture frame is illuminated at the time it is exposed in the film gate.

2. A motion picture projector as claimed in claim 1 and wherein the light shuttering device comprises a disc having radial slots therein.

3. A motion picture projector as claimed in claim 1 and wherein the light shuttering device comprises a hollow drum having peripheral slots therein.

4. A motion picture projector including a film gate for exposing a picture frame, means for continuously moving a motion picture film having successive picture frames thereon through said gate, a light source, a slotted light shuttering device positioned between the light source and the film gate, means focussing an image of the light source at the plane of the shuttering device, means to illuminate a picture frame exposed in the film gate with light passing through a slot of the shuttering device, means for rotating said shuttering device in synchronism with the film movement and in such manner that each successive picture frame is illuminated at the time it is exposed in the film gate, and means successively bringing the light source to full brilliancy as each slot receives the light source image.

5. A motion picture projector including a film gate for exposing a picture frame, means for continuously moving a motion picture film having successive picture frames thereon through said gate, an electrically operated light source, a slotted light shuttering device positioned between the light source and the film gate, means focussing an image of the light source at the plane of the shuttering device, means to illuminate a picture frame exposed in the film gate with light passing through a slot of the shuttering device, means for rotating said shuttering device in synchronism with the film movement and in such manner that each successive picture frame is illuminated at the time it is exposed in the film gate, said light source having a normal brilliancy at a selected voltage, and means selecting a greater voltage for increased brilliancy in synchronism with film and shuttering movement and at the time each successive picture frame is exposed in the film gate.

6. A motion picture projector as claimed in claim 5 and wherein the means selecting a greater voltage for increased brilliancy interrupts the current when the shuttering device masks the light source.

7. A motion picture projector including a film gate for exposing a picture frame, means for continuously moving a motion picture film having successive picture frames thereon through said gate, a light source, a slotted light shuttering device positioned between the light source and the film gate, means focussing an image of the light source at the plane of the shuttering device, means to illuminate a picture frame exposed in the film gate with light passing through a slot of the shuttering device, means for rotating said shuttering device in synchronism with the film movement and in such manner that each successive picture frame is illuminated at the time it is exposed in the film gate, a viewing screen, and means for imaging the film on the screen.

8. A motion picture projector including a film gate for exposing a picture frame, means for continuously moving a motion picture film having successive picture frames thereon through said gate, a projection light source, a condenser lens between the light source and the film gate for forming an image of the light source, a radial slotted shutter at the image plane of the condenser lens, means for rotating said shutter in synchronism with the film movement to pass the light from the source when a picture frame is exposed in the film gate, and an objective lens for forming an image of the exposed picture frame.

STEWART L. CLOTHIER.